(12) United States Patent
Meddaugh et al.

(10) Patent No.: US 8,533,621 B1
(45) Date of Patent: Sep. 10, 2013

(54) COMMUNICATION SYSTEM AND METHOD OF USE THEREOF

(71) Applicants: Katherine S. Meddaugh, Rochester, NY (US); Mary D. Seebach, Rochester, NY (US)

(72) Inventors: Katherine S. Meddaugh, Rochester, NY (US); Mary D. Seebach, Rochester, NY (US)

( * ) Notice: Subject to any disclaimer, the term of this patent is extended or adjusted under 35 U.S.C. 154(b) by 0 days.

(21) Appl. No.: 13/663,017

(22) Filed: Oct. 29, 2012

Related U.S. Application Data

(60) Provisional application No. 61/641,080, filed on May 1, 2012.

(51) Int. Cl.
*G06F 3/02* (2006.01)
*G09B 21/00* (2006.01)

(52) U.S. Cl.
USPC .............. 715/773; 341/21; 345/156; 434/112

(58) Field of Classification Search
USPC ........... 715/773; 341/21; 345/156; 434/112
See application file for complete search history.

(56) References Cited

U.S. PATENT DOCUMENTS

| | | | |
|---|---|---|---|
| 58,463 A | 10/1866 | Nourse | |
| 1,962,687 A | 11/1933 | Hodge | |
| 3,771,156 A * | 11/1973 | Watts et al. | 345/156 |
| 4,204,341 A | 5/1980 | Nowak | |
| 4,642,610 A * | 2/1987 | Smith, III | 341/21 |
| 4,795,348 A * | 1/1989 | Garthwaite | 434/112 |
| 5,953,541 A * | 9/1999 | King et al. | 710/67 |
| 6,943,776 B2 * | 9/2005 | Ehrenburg | 345/168 |
| 7,152,213 B2 * | 12/2006 | Pu et al. | 715/812 |
| 7,872,595 B2 * | 1/2011 | Park et al. | 341/22 |
| 2005/0116927 A1 * | 6/2005 | Voelckers | 345/157 |
| 2008/0284863 A1 * | 11/2008 | Fujiwara | 348/220.1 |
| 2013/0100029 A1 * | 4/2013 | Moon | 345/168 |

* cited by examiner

*Primary Examiner* — Jordany Nunez
(74) *Attorney, Agent, or Firm* — Tracy Jong Law Firm; Tracy P. Jong; Louis Reale

(57) ABSTRACT

This invention generally relates to a communication system founded on character recognition utilizing a graphical display and method of use thereof. The invention is primarily directed to enable communication with disabled individuals in conjunction with a communication partner or receiver who manipulates a graphical display. The primary focus of the present invention is to provide a communication system that enables expeditious discovery of the sender selected series of characters, thereby permitting time-effective communications. The present invention utilizes a graphical display where characters are grouped into quadrants, chunks, or the like. The characters comprising the quadrants are further organized based on a set of character guidelines. The set of character guidelines include, but not limited to character frequency of occurrence, consonant blend considerations, and the like.

34 Claims, 4 Drawing Sheets

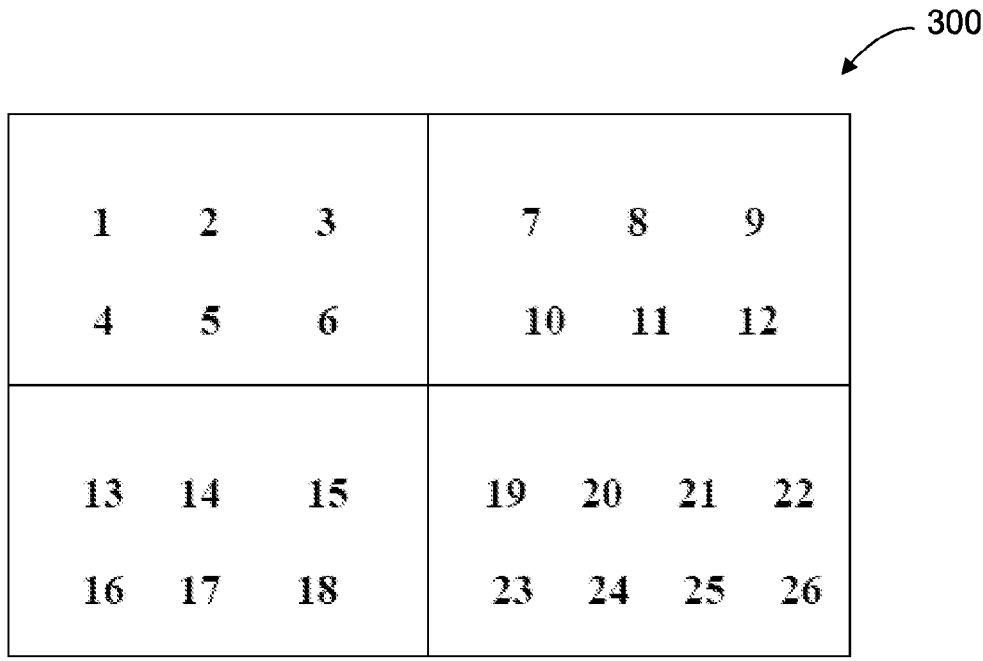
FIG. 3  Positions or Coordinate Locations
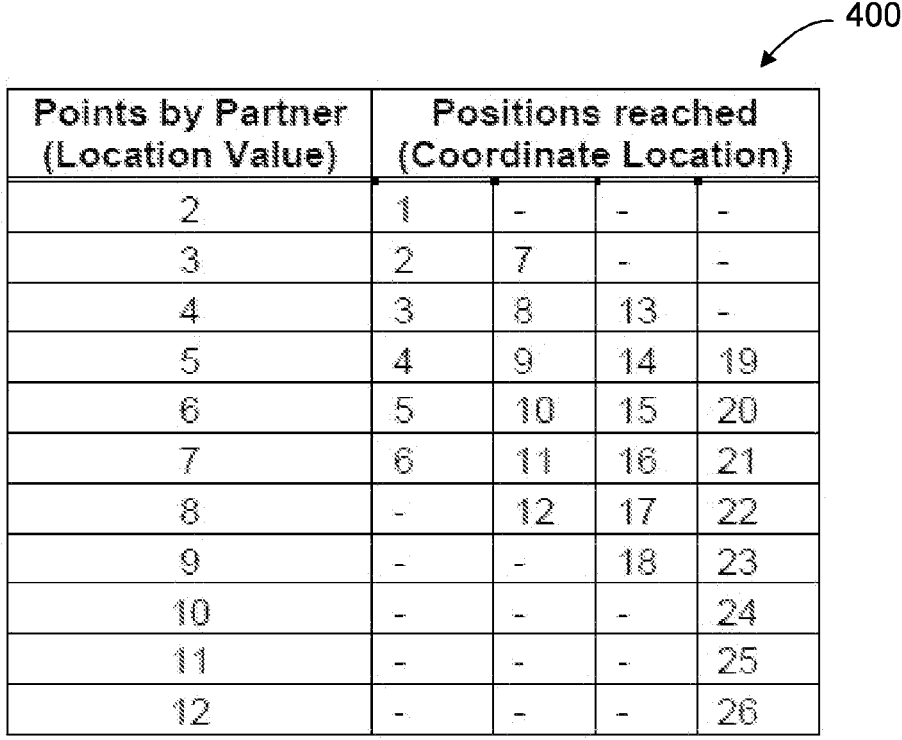
FIG. 4  Receiver initiated Points or Prompts to Reach Specific Coordinate Locations

| Character Value(s) (CV) | Character (Letter) |
|---|---|
| 2 | S |
| 3 | N, R |
| 4 | D, H, T |
| 5 | F, E, C, A |
| 6 | G, L, M, I |
| 7 | Y, V, P, O |
| 8 | K, B, U |
| 9 | W, X |
| 10 | Z |
| 11 | J |
| 12 | Q |

*FIG. 5*   Exemplary Character Value(s) for Letter type Characters

*FIG. 6*   An Exemplary Embodiment of the Present Invention

COMMUNICATION SYSTEM AND METHOD OF USE THEREOF

RELATED APPLICATIONS AND PRIORITY CLAIM

This application claims priority to provisional application U.S. Ser. No. 61,641,080 filed on May 1, 2012. This application is incorporated by reference herein in its entirety.

FIELD OF THE INVENTION

This invention generally relates to a communication system founded on character recognition utilizing a graphical display. In a more specific aspect, the present invention is primarily directed to a communication system to enable a disabled individual to communicate with the assistance of a communication partner or receiver utilizing a graphical display.

BACKGROUND OF THE INVENTION

Simple alphabet boards or alphanumeric displays for the purpose of communication with disabled individuals are known in the art. For example, U.S. Pat. No. 1,962,687 (to Hodge), U.S. Pat. No. 58,463 (to Nourse), and U.S. Pat. No. 4,204,341 (to Nowak), all describe alphabet or alphanumeric boards having letters of the alphabet individually laid out in sequential order. Designs using such a serial layout of characters possess a variety of shortcomings, including the length of time required to construct a word when communicating using partner assisted scanning (a commonly used technique when the disabled individual is unable to initiate letter selections via pointing). The lengthy routine can quickly become tedious for both the disabled individual as well as the communication partner.

Another example is directed to the dictation of author Jean-Dominique Bauby's novel entitled: "The Diving Suit and the Butterfly". Mr. Bauby, a disabled individual having Locked-in Syndrome, was able to communicate with the assistance of a communication partner using a French language letter frequency ordered alphabet board. The frequency ordered alphabet board (containing 26 letters), while faster than the aforementioned designs, still took approximately two minutes to communicate the average word. The communication routine consisted of a communication partner serially moving from one letter to the next while concurrently awaiting an authorizing eye blink from Mr. Bauby to confirm the selection.

Accordingly, in view of the foregoing deficiencies, there exists a clear motivation in the communication arts directed to the disabled, for new and useful improvements.

SUMMARY OF THE INVENTION

The present disclosure discloses a graphical display for communication based on character recognition between a sender and a receiver, constructed from a set of characters associated with a predetermined language, wherein the graphical display enables expeditious discovery of the sender selected character by the receiver.

The present invention generally relates to a communication system based on individual character recognition utilizing an improved graphical display and method of use, wherein the system enables expeditious character discovery by the receiver (communications partner) from the sender (disabled individual). An avenue for communication is established by the accumulation of individual characters by the receiver, wherein the construction of words, sentences, and the like, are formed. In order for the communication system to properly function, it is expected that both the sender and the receiver have at least rudimentary literacy skills. Additionally, the sender (disabled individual) should possess enough visual acuity (clearness of vision) in order to decipher characters as well as character groups from a graphical display.

The utmost benefit offered by the communication system is directed to disabled individuals that neither speak nor are able to point in any manner, including physically pointing, nor able to reliably utilize any of the pointing based communication technologies (e.g. head tracking devices, eye or pupil detecting type apparatus, or the like). The sender should possess a substantially reliable selection response, signal or motion as a means for communicating with the receiver; the selection response provides an avenue for confirming the character selection. A selection response can include a deliberate blink of the eyes, a gesture, a vocal sound, or the like. Individuals that have lost a substantial amount of muscle control can typically benefit from the present invention, including individuals with Amyotrophic Lateral Sclerosis (ALS) or Lou Gehrig's disease, Locked-in Syndrome, stroke victims, accident victims, and the like.

Accordingly, it is an object of the present invention to provide a relatively inexpensive, simple communication system primarily designed for disabled individuals who have lost a substantial amount of muscle control.

It is another object of the present invention to provide a graphical display for communication based on character recognition between a sender and a receiver that enables expeditious discovery of individual characters.

It is yet another object of the present invention to provide a graphical display containing a series of distinct quadrants where each quadrant contains a group of unique characters or letters organized and arranged to promote expeditious discovery of individual characters when practicing the method of the present invention. There is no limitation to the number and size of quadrants utilized in the graphical display. Expeditious character discovery or decrease of the average time required for character discovery can be improved through a variety of means, including, but not limited to organizing characters into groups, letter arrangements based on character occurrence frequency, consonant blends, separation of similar looking characters of letters, or any combination thereof.

It is yet another object of the present invention to provide a graphical display containing a series of distinct quadrants where each quadrant contains a group of unique characters or letters where the vowels are highlighted and substantially grouped together.

It is yet another object directed to particular embodiments of the present invention to provide a graphical display used in conjunction with a high contrast pointing device to enhance visibility.

It is yet another object of the present invention to provide a graphical display imprinted on a permanent display or a physical surface (e.g. a card, a board, a wall, a table top, place-mats, or the like).

It is yet another object of the present invention to provide a graphical display that can be exhibited on a nonpermanent display means (e.g. a television display, computer monitor, a laptop, monitor possessing portable devices, or the like).

It is yet another object directed to particular embodiments of the present invention to provide a device that is durable, washable, reliable, and portable.

It is yet another object directed to particular preferred embodiments of the present invention to provide a device and associated method wherein a character can be identified with two selection responses from the sender.

It is yet another object of the present invention to provide a device that can be easily operated by a receiver type user.

It is yet another object of this invention to provide a relatively simple device that is economical from the viewpoint of the manufacturer and consumer, is susceptible to low manufacturing costs with regard to labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

PARTICULAR ADVANTAGES OF THE INVENTION

The present invention provides a simple, cost-effective, efficient solution directed to a communication system that enables disabled individuals to communicate utilizing a graphical display and associated streamlined method of use. The primary focus of the present invention is to provide a communication system that enables expeditious discovery of sender selected characters by a receiver permitting time-effective communications. It is understood that by dividing a character comprising graphical display into quadrants, groups, or chunks, the time or effort required to converge or discover a sender's character is substantially reduced.

In apparatus based embodiments of the present invention, the graphical display can be imprinted on any printable surface. The graphical display can utilize and exploit the portability of placemat or board type surfaces. Additionally, such substrates can be easily configured to a variety of consumer specific requirements. For example, a high quality, waterproof graphical display board can be configured for long term or professional use; low cost units can be configured from cardboard or like paper products—such as disposable food tray liners, place settings, and the like.

Additionally, the graphical display of the present invention can be exhibited on nonpermanent display means. Nonpermanent displays include television type displays, computer monitors, laptops, portable devices possessing displays (e.g. LCD), and the like. The graphical display can be displayed on the nonpermanent display via a variety of methods well known in the art. Certain embodiments may require the receiver to point and search on the nonpermanent display in a manner similar to an apparatus type embodiment; other embodiments can allow software based pointing and selection methods. Other advantages directed to software based nonpermanent display means include the ability to quickly change character size, color; font type, and the like. Such systems can additionally provide a convenient means for storing previous character selections as the communication progresses.

Additional advantages of the present invention over some commonly used communication technologies are summarized in the following table. It is based on the experiences of an exemplary field test patient and communication partner.

| Method of Communication (Prior Art) | Eventual Drawback (Prior Art) | How This Invention Solved It (Present Invention) |
| --- | --- | --- |
| Verbal, person to person | Speech became unintelligible | Avoided the need for the patient to communicate verbally |
| Manual signaling (homemade sign language) | Unable to form shapes with hands | Avoided the need for hand dexterity |
| Word processor, 'qwerty' keyboard with computer screen. Hunt and peck typing with some fingers on both hands. | Unable to manipulate a regular, standard sized keyboard. | Avoided the need for manual inputting of data via a keyboard. |
| | Not reasonable to bring to another floor to use | This graphical display can be extremely portable. |
| Computer screen with various display capabilities. The screen could be changed to show letters, icons, and words or phrases that the user had chosen. This machine had online capabilities including email. It also had a speech generating device. The user touched a screen to select. | The ability to select from the screen using one finger was lost. | Avoided the need to use a touch screen. |

-continued

| Method of Communication (Prior Art) | Eventual Drawback (Prior Art) | How This Invention Solved It (Present Invention) |
|---|---|---|
| The machine was placed on a table or tray attached to the wheelchair. | Setting the machine up in a location that was good for the patient was difficult. This device could not be easily moved from room to room or floor to floor. | This graphical display can be positioned according to the sender's needs. It can also be extremely portable. |
| It was possible to use one's own voice to record the speech. | The window of opportunity was too brief. Patient unable to prerecord words and phrases. | Avoided the need for speech. |
| The same device as described directly above with a forehead controlled mouse for selection. | The ability of the neck to keep the head in the correct position to see the screen was lost. | The functionality of the graphical display does not require head-neck endurance, or precise head movements. |
| The same device as described above with a retinal eye tracking accessory. | The adjustments and calibrations required were unable to be completed satisfactorily. Difficult to use in natural light. | The graphical display does not require calibration. The device functions under a wide range of environmental illumination intensities. |

BRIEF DESCRIPTION OF THE DRAWINGS

The ensuing detailed description section makes reference to the annexed drawings. An enhanced understanding of the present invention will become evident when consideration is given to the detailed description thereof and objects other than the aforementioned become apparent. The invention will be described by reference to the specification and the annexed drawings, in which like numerals refer to like elements, and wherein:

FIG. 3 illustrates an array of coordinate locations or positions 300, for a graphical display having a geometrical layout corresponding to the following exemplary graphical displays: graphical display 200 of FIG. 2, graphical display 300 of FIG. 3, and graphical display 600 of FIG. 6.

FIG. 4 illustrates a table revealing the number of receiver (partner) initiated points or prompts needed to arrive at each specific position or coordinate location. The tabular organized layout is depicted in array of coordinate locations 300 of FIG. 3.

FIG. 5 illustrates an exemplary character value table 500 revealing a character value associated with each character (letter). Each character is assigned a character value based on a set of character guidelines.

FIG. 6 illustrates an exemplary graphical display 600. The character (letter) layout of exemplary graphical display 600 is substantially forged from the characters having higher ranked character values shown in table 500, populating the corresponding higher ranking coordinate locations delineated in table 300.

DEFINITIONS OF TERMS USED IN THIS SPECIFICATION

Figure 1:
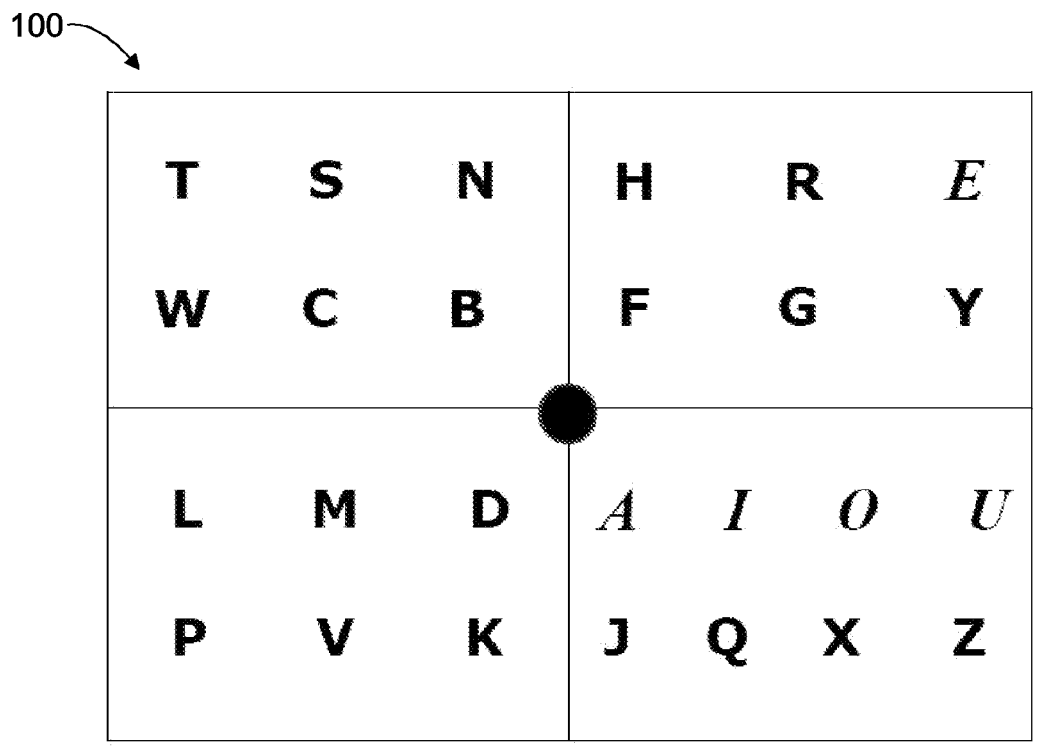
FIG. 1 illustrates a front view of an exemplary graphical display 100. Exemplary graphical display 100 is intentionally free of lead lines, part numbers, and the like, to clearly display one embodiment of the present invention.

The communication system and method of use thereof discussed throughout this disclosure shall have equivalent nomenclature, including the device, the graphical display, the communication system, the system, the present invention, or the invention. Additionally, the term exemplary shall possess a single meaning throughout this disclosure; wherein the sole definition pertains to serving as an example, instance, or illustration.

The term "receiver", is understood to include and define an individual that assists the disabled individual communicate using the graphics display of the present invention. The receiver is the individual that receives the communication from the disabled individual or the sender. Other equivalent terms to the term receiver include caregiver, communication partner, aide, and the like.

The term "sender" is understood to include and define an individual that communicates to the receiver. In relation to the present invention, the sender is typically a disabled individual who has lost a substantial amount of muscle control such that they are unable to speak or point in any consistently reliable manner. Other equivalent terms to the term sender include patient, disabled individual, and the like.

The terms top-left based priority or top-left based scanning are understood to include and define the basic pattern of a search or scanning routine that mimics the coordinate motions of reading and writing associated with the English language, and like languages. More specifically, the English language is written and read starting from the top-left portion of a document followed by a left to right motion, sequentially moving through the text in a downward line to line iterative fashion until the page is completely read. Therefore, the point of origin or starting point in a typical document is the top-left. The benefit being that those familiar with the English language (and like coordinate languages) will already be accustomed to such coordinate motions or scanning routine.

The terms: coordinate location(s), quadrant coordinate location(s), quadrant position, or position is understood to include and define the array of each unique spatial location within each distinct quadrant, as well as the entire array comprising the plurality of distinct quadrants. Every coordinate location comprising the graphical display or chart of the present invention represents a unique position or location.

The term "location value", is understood to define a figure of merit associated with each coordinate location comprising a graphical display. The figure of merit corresponds to the number of points, cues, or prompts required by the receiver to arrive at a given coordinate location. Stated another way, each coordinate location has a location value based on the effort required to reach each coordinate location. The higher ranked location values require fewer receiver prompts to reach the associated coordinate location. An exemplary depiction is given by FIG. 4, where the location value is given the same numerical value as the number of receiver prompts (points by partner) to arrive at a given coordinate location. The location values range from 2 to 12, where location value 2 is the highest ranking or most valuable, and location value 12 is the lowest ranking or least valuable.

The terms "character value" and "character guidelines" shall be understood and defined as follows. Each character (e.g. letter) shall possess a character value derived from a set of character guidelines that primarily functions as a design guide to increase the probability of early character detection and selection substantially based on character occurrence frequency, as well as common character combinations. Other considerations include separation of similar shaped characters, vowel grouping, and the like. The term character value(s) is understood to define a figure of merit associated with each character originating from a set of characters associated with a given language utilized in a graphical display.

The term "selection response", shall be understood and defined as a predetermined action or actions produced by the sender to confirm a receiver prompted selection off a graphical display. The sender produced selection response can include any receiver detectable signal, for example a blink of one or both eyes, the movement of a limb or finger, a vocal response, or the like.

The term "distinguishing feature", as it pertains to the graphical display of the present invention and subcomponents (e.g. quadrants, rows, characters, letters), shall be understood and defined as a visual characteristic to provide a differentiating mark for contrasting and discerning purposes. Such features include highlighting, coloring, the use of differentiating font styles and/or sizes relative to the document common characteristics.

The term "character", shall be understood and defined as a graphic symbol used in writing or printing that includes letters of the alphabet, grammatical and punctuation symbols, numbers, and the like. The term character shall function as a more general term and include the terms "letter(s)", "alphanumeric", and their associated everyday meanings.

The term "stop button", as it pertains to the graphical display of the present invention, shall be understood and defined as a symbol or mark used to communicate the completion of a word, sentence, phrase, or the like. By way of example, but not limitation, the stop button can assume a circular, or octagon shape (the shape of a stop sign traffic device); in practice, the stop button can assume practically any geometry and color.

The term "quadrant" is understood to include and define a subdivision of the graphical display containing a group of characters. In certain embodiments, the number of quadrants utilized is four (as depicted in FIG. 1). With respect to this disclosure, the term "quadrant" shall be understood to include at least two subdivisions of the graphical display containing a group of characters. Therefore the number of quadrants or groups comprising a graphical display can have values other that four.

To help facilitate disclosure understanding and streamline the location of figures and associated part numbers, a systematic parts/features numbering convention has been employed. The first digit in three digit part numbers refers to the figure number where the part was first introduced, or is best depicted. Likewise, in four digit part numbers, the first two digits refer to the figure number where the part was first introduced, or is best depicted. Although this disclosure may at times deviate from this convention, it is the intention of this numbering convention to enable expeditious comprehension of the disclosure.

PARTS/FEATURES LIST

100. exemplary graphical display (clearly depicted)
200. exemplary graphical display (components delineated)
201. first quadrant
202. second quadrant
203. third quadrant
204. fourth quadrant
206. upper row (comprising letters T, S, and N)
208. lower row (comprising letters W, C, and B)
210. stop button
212. vowel row (comprising vowels A, I, O, and U)
214. vowel "E" location
216. first quadrant perimeter
218. second quadrant perimeter
220. third quadrant perimeter
222. fourth quadrant perimeter
224. border (border portion shared by third and fourth quadrants)
226. first quadrant background
228. second quadrant background
230. third quadrant background
232. fourth quadrant background
300. array of coordinate locations or positions
400. points table, prompts table, or location value table
500. character value table (for exemplary graphical display 600)
600. exemplary graphical display
700. exemplary flowchart (graphical display method of use)
702. start block
704., 706., 708., 710., 714., 718., 724., 728. process block
712., 716., 722., 726., 730. decision block
732. end block

DETAILED DESCRIPTION

With reference to the drawings of the present invention, several embodiments pertaining to the communication system and method of use thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Terminology of similar import other than the words specifically mentioned above likewise is to be considered as being used for purposes of convenience rather than in any limiting sense.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" can be used interchangeably.

In this context, the communication system, more particularly the apparatus or device based version of the graphical display can be constructed from a variety of durable materials including plastics (polymeric based materials), paper, cardboard, composites, or the like. These types of structures shall be defined as permanent display means. In preferred embodiments the device is constructed from washable, wear-resistant, type of materials or material combinations. It is understood that material considerations are largely dependent on a variety of factors, including the desired properties or characteristics of the device dictated by expected environmental conditions, device cost considerations, and the like. Additionally, the graphical display of the present invention can be exhibited on a nonpermanent display means. Means for nonpermanent display include: television type displays, computer monitors, laptops, portable devices possessing displays, and the like.

FIG. 1 illustrates a front view of an exemplary graphical display 100. Exemplary graphical display 100 clearly displays one embodiment of the present invention, substantially free of lead lines, part numbers, and the like. Graphical display 100 depicts a typical chart type structure that can be displayed on permanent as well as nonpermanent display means.

A receiver's finger or a simple instrument such as a pen or pencil can be used as a pointing device used in conjunction with graphical display 100. However, in preferred embodiments, a pointing/indicating instrument possessing high contrast properties prove beneficial when used with the exemplary graphical display 100. It is preferable that pointing/indicating type instruments possess characteristics that are highly visible to both the receiver and the sender/patient (e.g. brightly colored tips, and the like). Additionally, the preferred pointing/indicating instrument should be light weight and comfortable for the receiver to hold, move and manipulate. An example of a preferred pointing/indicating instrument tested was a common fine point permanent marker possessing a black cap. The cap end portion of the indicator/pointer provides a highly perceivable means for making selections on the graphical display 100. Additionally, the high contrast means for pointing characteristics extend to electronic embodiments, wherein a high contrast cursor or pointer is utilized. In all cases, the pointing/indicating instrument is configured to be manipulated or controlled by the receiver.

Figure 2:
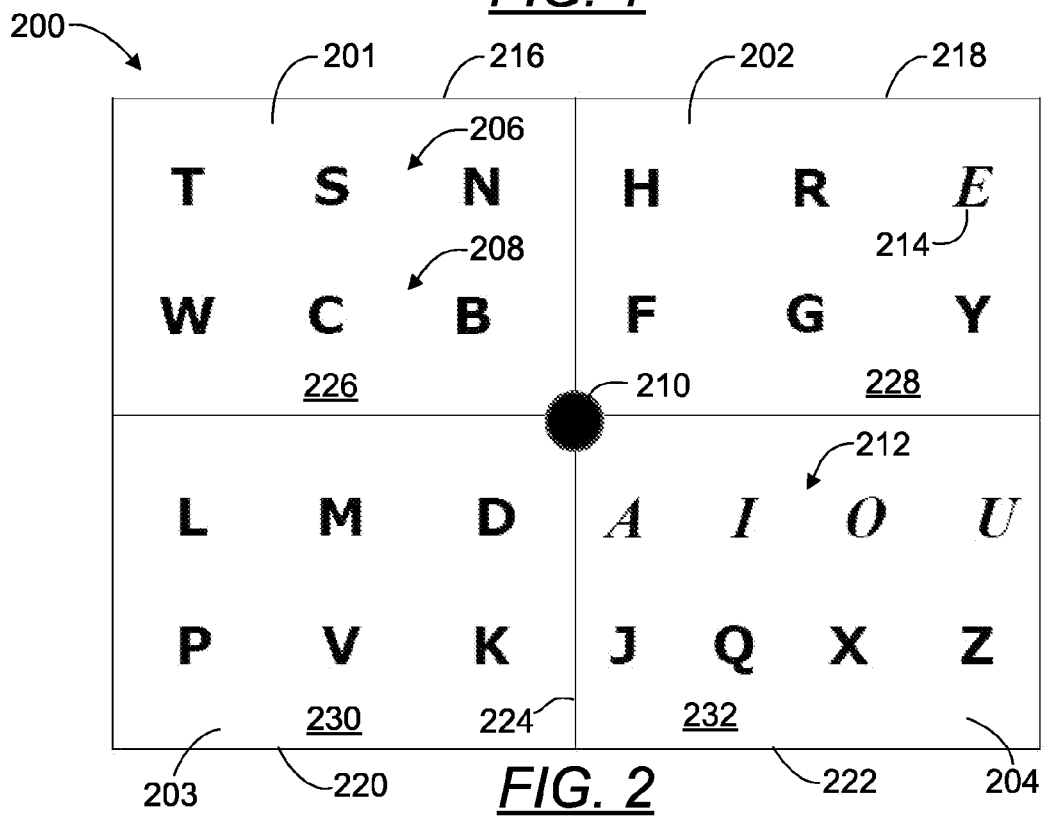
FIG. 2 illustrates an exemplary graphical display 200. Additionally, the various components of exemplary graphical display 200 of the present invention are delineated.

FIG. 2 illustrates an exemplary graphical display 200. The various components of exemplary graphical display 100 of the present invention (shown in FIG. 1) are delineated in greater detail in graphical display 200. Graphical display 200 is comprised of four distinct contiguous quadrants: first quadrant 201, second quadrant 202, third quadrant 203, and fourth quadrant 204. Each of the four quadrants contains a group of coordinate locations arranged in generally rectilinear array, structurally organized to comprise an upper row 206 and a lower row 208, wherein each row contains a horizontal string of characters.

Each distinct quadrant additionally includes a background and a perimeter. Wherein first quadrant 201 includes perimeter 216 and background 226; second quadrant 202 includes perimeter 218 and background 228; third quadrant 203 includes perimeter 220 and background 230; and fourth quadrant 204 includes perimeter 222 and background 232. A multitude of contrasting and dividing features can be utilized to distinguish the four quadrants from each other. In certain embodiments the backgrounds of each quadrant can differ in color, shade, or the like. In other embodiments, a border or divider disposed about at least a portion of the perimeter associated with one or more quadrants will help provide a means for distinguish the four quadrants from each other. Still, in other embodiments, combinations of contrasting borders, quadrant backgrounds, and the like features can be implemented. Border 224 separates quadrant 203 from fourth quadrant 204, this depicts an example of a shared border.

In preferred embodiments, the contiguous quadrants may possess distinguishing features, such as wide dark quadrant dividing lines. Such a distinguishing feature would help prevent any doubt as to the partitioning of the graphical display 200 into distinct quadrants. Additionally, other types of distinguishing features can be utilized for specific purposes, for example special characters, such as vowels, as depicted in vowel row 212 and vowel "E" location 214, where each of the vowels is italicized.

Again, referring to exemplary graphical display 200 of FIG. 2, in preferred embodiments, the display includes stop button 210 or any functionally equivalent feature. The stop button provides a means for communicating or confirming word completion. In certain embodiments, the stop button can additionally provide a means for signaling the end of a communication. In certain embodiments, the stop button may possess a distinguishing feature causing the button to standout; for example, constructing the stop button in the form of a solid red circle, or the like. It is understood that stop button 210 can assume a multitude of functional equivalents, which can vary in shape, size, color, location, and the like.

FIG. 3 illustrates an array of coordinate locations 300. The array of coordinate locations 300 is the organizational backbone to correspond to a graphical display having like geometrical layouts (number, and placement of coordinate location within like quadrants). Array of coordinate locations 300 is the organizational backbone to graphical display 200 of FIG. 2, graphical display 300 of FIG. 3, and graphical display 600 of FIG. 6. Each coordinate location is sequentially numbered from 1 to 26 on array of coordinate locations 300, wherein each coordinate location represents a unique position or location.

The sequentially numbered coordinate locations (1 to 26) are formed and defined via top-left based scanning, a familiar spatial routine associated with the typical coordinate motions utilized when reading and writing in the English or like languages. The analogy, as best depicted in exemplary graphical display 200 of FIG. 2, is delineated as follows: each quadrant is like a page in a book (e.g. first quadrant 201); each row is like a sentence (e.g. upper row 206, lower row 208); and each horizontal string of characters in each row is analogue to a word. Since the point of origin or starting point in a typical document is the top-left, this coordinate location is given the numerical value of 1 (for quadrant one). Each subsequent top-left based scanning movement results in the next coordinate location receiving the next progressively higher whole number, up to coordinate location 26, located in the lower right corner of the fourth quadrant, as depicted in array of coordinate locations 300.

It is understood that the present invention can also be configured to operate in most any language, including language systems that possess different base characters (alphabet, punctuation, and the like) than those utilized in the English language. The present invention can be tailored to function in language systems having foundation coordinate motions other than the top-left based scanning protocol used in the English language system. The present invention, in addition to the utilization of the fundamental alphabetic characters, can include numbers, punctuation characters, special characters, or any combination thereof to enhance communications between the sender and receiver.

FIG. 4 illustrates location value table 400, revealing the number of receiver initiated points or prompts to arrive at each specific position or coordinate location depicted in array of coordinate locations 300 of FIG. 3. The receiver initiated prompts is based on exemplary flowchart 700 of FIG. 7, which delineates an exemplary method of use associated with the graphical display of the present invention. The location value, depicted in the left column of location value table 400, is based on a figure of merit system spatially associated with each coordinate location depicted in array of coordinate locations 300 of FIG. 3. The location value figure of merit corresponds to the number of points, cues, or prompts required by the receiver to arrive at a given coordinate location (depicted in the right column of location value table 400). Therefore, each coordinate location has a location value substantially based on the time or effort required to reach each coordinate location. The higher ranking location values are associated with coordinate locations requiring fewer receiver prompts to reach, thereby possessing a shorter estimated time of arrival to achieve the coordinate location. In the present embodiment, the highest ranking location value is bestowed the numerical value of 2, and the lowest ranking location value is bestowed the numerical value of 12.

FIG. 5 illustrates an exemplary character value table 500 revealing a character value associated with each character. With respect to the characters, letters of the alphabet are solely utilized in this particular embodiment. Each character is assigned a character value based on a set of character guidelines. The character guidelines primarily function as a design guide to increase the probability of early character detection and selection substantially based on character occurrence frequency, as well as other considerations. By way of example, but not limitation, the following is an exemplary set of character guidelines or character placement guidelines.

Character Guidelines:
1. The more frequently occurring letters would be placed in the top row of each box as much as possible. The second letters of common consonant blends would be treated the same.
2. The letters of consonant blends e.g. bl, tr, gh are in close proximity to each other. Ideally the consonant blends are disposed adjacent to each other, followed by residency in the same row, and lastly residing in the same quadrant.
3. The letter "E" would have a top row position. Additionally, in preferred embodiments, the letter "E" would be given a distinguishing feature (e.g. italicized, highlighted, or the like).
4. The other vowels A, I, O, and U would have top row position in quadrant or box 4. Additionally, in preferred embodiments, the vowels would be given a distinguishing feature (e.g. italicized, highlighted, or the like).
5. J, Q, X, and Z, the least frequently occurring letters, would be the bottom row of the same box.
6. Letters which are usually followed by a vowel would be scattered throughout the quadrants.
7. Letters with similar shapes would not be near each other.
8. The design would avoid the use of an A to Z or 'qwerty' layout.

The character value table 500 of FIG. 5 is constructed using the above character guidelines. Each character value is understood to represent a figure of merit associated with each character utilized in a graphical display. In the present embodiment, the highest ranking character value is bestowed the numerical value of 2, and the lowest ranking character value is bestowed the numerical value of 12. Generally, the higher ranking character values tend to be associated with letters having a higher letter occurrence frequency or occurrence frequency, whereas letters having a low occurrence frequency are assigned lower character values; hence, the letter "S" is given a character value of 2, whereas the letter "Q" is given a character value of 12. In the present embodiment, certain letter groups can possess the same character value; further subdivision ranking (e.g. 5a, 5b, 5c, and 5d) can be assigned to account for letter subgroup hierarchy, if detected. For example in FIG. 5, character value 5a can correspond to the letter "F"; 5b can correspond to the letter "E", and so forth. The character guidelines function as a guide-tool to assign a character value figure of merit to each letter to be used in the graphical display.

FIG. 6 illustrates an exemplary graphical display 600. The character (letter) layout of exemplary graphical display 600 is substantially forged from the characters having higher ranked character values shown in table 500, populating the corresponding higher ranking location values linked with each coordinate location delineated in table 400. It is understood that some graphical display embodiments may include a period of trial and error. Characters may have to be arranged using preliminary results obtained from an initial pass through the character guidelines criteria, followed by subsequent fine tuning of the character arrangement. A certain amount of character re-arrangement is expected because certain criteria included in the character guidelines possess spatial relationships that are best processed in a graphical type format.

Figure 7:
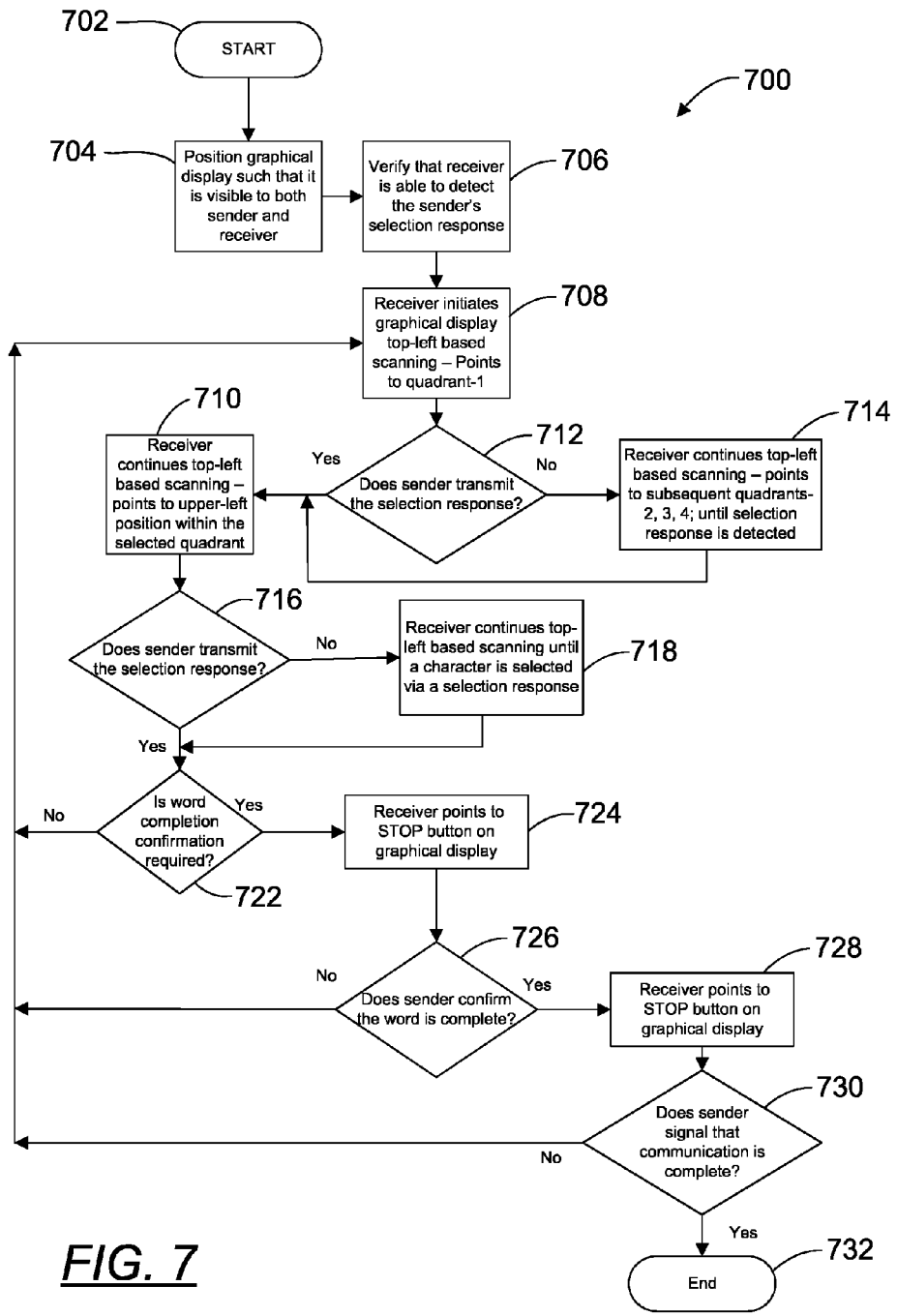
FIG. 7 illustrates an exemplary flowchart 700 pertaining to a method of use associated with the graphical display of the present invention.

FIG. 7 illustrates an exemplary flowchart 700 pertaining to the method of use of a graphical display of the present invention. The communication method is based on the recurring discovery of a series of individual characters where the accumulation of the received characters, lead to the construction of words, sentences, and the like.

The process starts with start block 702 where the sender possesses a communication that they wish to deliver. In order for the method associated with the communication system of the present invention to properly function, it is expected that both the sender and the receiver have at least rudimentary literacy skills. Process block 704 ensures that the graphical display is positioned such that it is simultaneously visible to both the sender and the receiver. Again, the graphical display can take on or manifest itself in a variety of forms including nonpermanent display means (e.g. television type displays, computer monitors, laptops, portable devices possessing displays, and the like), as well as permanent type means for display (e.g. a card, a board, a wall, a table top, placemats, or the like).

Process block 706 ensures that the receiver is properly positioned such that they are able to detect the sender's selection response while they manipulate the graphical display. The selection response is a predetermined action or signal produced by the sender to confirm a receiver prompted selection off of the graphical display. Selection responses can include most any receiver discernible motion or sound that can be produced by the sender (e.g. blink of one or both eyes, the movement of a limb or finger, a vocal response, or the like).

Process block 708 initiates graphical display top-left based scanning by the receiver where the receiver points to quadrant-1 section of the graphical display. Decision block 712 directs the receiver to monitor the sender for the transmission of the predetermined selection response. If the selection response is received, then the receiver knows that the character of interest is located in quadrant 1, and can proceed to process block 710; else the receiver moves to process block 714 where they continue top-left based scanning—consecutively pointing to subsequent quadrants—2, 3, 4 until the quadrant containing the character (letter) of interest is chosen via a selection response. Once the character-containing quadrant is chosen by the sender, the receiver proceeds to process block 710.

Again referring to exemplary flowchart 700 of FIG. 7, process block 710 is directed to the chosen quadrant containing the character (letter) of interest, where the receiver continues top-left based scanning starting at the character located in the upper-left coordinate location in the chosen quadrant. Decision block 716 directs the receiver to monitor the sender for the selection response for the initial upper-left coordinate location, if a selection response is received, then the receiver takes note of the character of interest residing in the coordinate location, and can proceed to decision block 722. If a selection response is not delivered when the receiver points to the initial or first upper-left coordinate location, then the receiver proceeds from decision block 716 to process block 718 where they continue top-left based scanning—consecutively pointing to subsequent character locations (using a top-left based scanning routine) until the sender's sought-after character is located and chosen via a confirming selection response.

Decision block 722 provides utility when the receiver, presented with a generated string of characters, is unsure or would like to confirm that the current word has been completed. Process block 724 directs the receiver to point to STOP button on graphical display, followed by decision block 726, which polls the sender if a word has been completed. If a word has not been completed, the receiver cycles back to process block 708 to retrieve the next character. If the sender signals that a word has been completed, the receiver takes note of the completed word and cycles back to process block 708 to retrieve the first character of the next word. Alternatively, if the receiver believes that the sender is finished with the entire communication, the receiver can immediately point a second time to STOP button on graphical display—as depicted in process block 728, followed by decision block 730, which polls the sender if the entire communication has been completed. If the sender signals that the communication been completed, the communication process is terminated as depicted in end block 732, else the receiver cycles back to process block 708 to retrieve the next character.

What is claimed herein is:

1. A method of using a graphical display for communication based on character recognition between a sender and a receiver, wherein said graphical display is configured from a set of characters associated with a predetermined language and said graphical display enables expeditious discovery of said sender-selected character by said receiver, said graphical display comprising:
 a plurality of distinct quadrants, wherein said plurality of distinct quadrants each having an array of coordinate locations, wherein each said coordinate location possesses a location value based on the effort required to reach each said coordinate location when said receiver utilizes a top-left based scanning routine, and
 each said coordinate location is populated with a unique character selected from said set of characters, wherein each said unique character possesses a character value substantially derived from a set of character guidelines, wherein said guidelines provides a character ranking system primarily directed to enable early character detection and selection, said character ranking system includes assigning a higher rank to said unique characters having a greater use frequency within said predetermined language, and
 said coordinate locations with a higher ranked said location value are substantially populated with a corresponding said unique characters having higher ranked said character values, wherein said higher ranked said coordinate locations are substantially populated with the higher ranked said unique characters, said method comprising the steps of:
 (a) having a communication that can be conveyed using a written language that a sender or receiver wishes to communicate, wherein the communication is comprised of words constructed from a plurality of characters; said communication commences with the identification of a first letter corresponding to a first word;
 (b) positioning the graphical display such that the display is visible to both the sender and the receiver;
 (c) initiating a sequential scan of quadrants located on the graphical display, using a top-left based scanning routine performed by the receiver;
 (d) observing the sender for a selection motion, thereby communicating to the receiver the particular quadrant containing the first letter of the first word of the communication of step(a);
 (e) initiating sequential scan of characters contained within the selected quadrant in step(d), using a top-left based scanning routine performed by the receiver;
 (f) observing the sender for a selection motion, thereby communicating to the receiver the first character of the first word of step(a); and noting the selected first character;
 (g) repeating steps (c) through (f) wherein each subsequent cycle provides additional characters, thereby enabling the completion of words that shape the foundation of the communication of step(a).

2. The method of claim 1, wherein said plurality of distinct quadrants includes a first quadrant, a second quadrant, a third quadrant, a fourth quadrant, and a stop button disposed thereon.

3. The method of claim 2, wherein each of said first quadrant, said second quadrant, said third quadrant, and said fourth quadrant is comprised of a top row and a bottom row wherein each said row includes at least three characters.

4. The method of claim 3, wherein said top row located in said fourth quadrant includes vowels A, I, O, U, and E, or any combination thereof.

5. The method of claim 4, wherein said bottom row located in said fourth quadrant includes letters J, Q, X, and Z.

6. The method of claim 3, wherein vowel E is disposed in any said top row.

7. The method of claim 4, wherein vowels A, E, I, O, and U include at least one distinguishing feature.

8. The graphical display of claim 1, wherein a plurality of characters selected from said set of characters are positioned such that similar shaped characters are not disposed adjacent to each other.

9. The method of claim 1, wherein a plurality of characters selected from said set of characters are positioned such that consonant blend characters are disposed in proximity to each other.

10. The method of claim 1, wherein said graphical display is exhibited on a nonpermanent display means.

11. The method of claim 1, wherein said graphical display is exhibited on a permanent display means.

12. The method of claim 1, further comprising a high contrast means for pointing, wherein said means for pointing is configured to be controlled by said receiver.

13. The method of claim 1, further comprising a stop button, whereby said receiver is able to confirm the completion of a word, sentence or phrase.

14. The method of claim 1, wherein each distinct quadrant further includes a quadrant background and a quadrant perimeter; and at least one said distinct quadrant further includes a border disposed about at least a portion of its said perimeter, wherein said border possesses a contrasting appearance for substantially differentiating each said distinct quadrant from each other, whereby a clear, visible distinction among each said quadrant helps remove ambiguity as to which quadrant is being referred to during use.

15. The method of claim 1, wherein said top-left based scanning routine performed by the receiver in steps (c) and (e), are executed using a pointing device.

16. The method of claim 1, wherein said graphical display includes a first quadrant, a second quadrant, a third quadrant, and a fourth quadrant, wherein each said quadrant is comprised of a top row and a bottom row wherein each said row includes at least three characters.

17. The method of claim 1, further comprising a stop button, wherein the receiver arriving at step (g), is uncertain of word completion, and therefore points to the stop button, and observes the sender for a selection motion to test for word completion.

18. A means for using a graphical display for communication based on character recognition between a sender and a receiver, wherein said graphical display is configured from a set of characters associated with a predetermined language and said graphical display enables expeditious discovery of said sender-selected character by said receiver, said graphical display comprising:
 a plurality of distinct quadrants, wherein said plurality of distinct quadrants each having an array of coordinate locations, wherein each said coordinate location possesses a location value based on the effort required to reach each said coordinate location when said receiver utilizes a top-left based scanning routine, and
 each said coordinate location is populated with a unique character selected from said set of characters, wherein each said unique character possesses a character value substantially derived from a set of character guidelines, wherein said guidelines provides a character ranking system primarily directed to enable early character detection and selection, said character ranking system includes assigning a higher rank to said unique characters having a greater use frequency within said predetermined language, and
 said coordinate locations with a higher ranked said location value are substantially populated with a corresponding said unique characters having higher ranked said character values, wherein said higher ranked said coordinate locations are substantially populated with the higher ranked said unique characters, comprising:
(a) a means for having a communication that can be conveyed using a written language that a sender or receiver wishes to communicate, wherein the communication is comprised of words constructed from a plurality of characters; said communication commences with the identification of a first letter corresponding to a first word;
(b) a means for positioning the graphical display such that the display is visible to both the sender and the receiver;
(c) a means for initiating a sequential scan of quadrants located on the graphical display, using a top-left based scanning routine performed by the receiver;
(d) a means for observing the sender for a selection motion, thereby communicating to the receiver the particular quadrant containing the first letter of the first word of the communication of step(a);
(e) a means for initiating sequential scan of characters contained within the selected quadrant in step(d), using a top-left based scanning routine performed by the receiver; and
(f) a means for observing the sender for a selection motion, thereby communicating to the receiver the first character of the first word of step(a); and
 noting the selected first character.

19. The means for claim 18, wherein said plurality of distinct quadrants includes a first quadrant, a second quadrant, a third quadrant, a fourth quadrant, and a stop button disposed thereon.

20. The means for claim 19, wherein each of said first quadrant, said second quadrant, said third quadrant, and said fourth quadrant is comprised of a top row and a bottom row wherein each said row includes at least three characters.

21. The means for claim 20, wherein said top row located in said fourth quadrant includes vowels A, I, O, U, and E, or any combination thereof.

22. The means for claim 21, wherein said bottom row located in said fourth quadrant includes letters J, Q, X, and Z.

23. The means for claim 20, wherein vowel E is disposed in any said top row.

24. The means for claim 21, wherein vowels A, E, I, O, and U include at least one distinguishing feature.

25. The means for claim 18, wherein a plurality of characters selected from said set of characters are positioned such that similar shaped characters are not disposed adjacent to each other.

26. The means for claim 18, wherein a plurality of characters selected from said set of characters are positioned such that consonant blend characters are disposed in proximity to each other.

27. The means for claim 18, wherein said graphical display is exhibited on a nonpermanent display means.

28. The means for claim 18, wherein said graphical display is exhibited on a permanent display means.

29. The means for claim 18, further comprising a high contrast means for pointing, wherein said means for pointing is configured to be controlled by said receiver.

30. The means for claim 18, further comprising a stop button, whereby said receiver is able to confirm the completion of a word, sentence or phrase.

31. The means for claim 18, wherein each distinct quadrant further includes a quadrant background and a quadrant perimeter; and at least one said distinct quadrant further includes a border disposed about at least a portion of its said perimeter, wherein said border possesses a contrasting appearance for substantially differentiating each said distinct quadrant from each other, whereby a clear, visible distinction among each said quadrant helps remove ambiguity as to which quadrant is being referred to during use.

32. The means for claim 18, wherein said top-left based scanning routine performed by the receiver in steps (c) and (e), are executed using a pointing device.

33. The means for claim 18, wherein said graphical display includes a first quadrant, a second quadrant, a third quadrant, and a fourth quadrant, wherein each said quadrant is comprised of a top row and a bottom row wherein each said row includes at least three characters.

34. The means for claim 18, further comprising a stop button, wherein the receiver arriving at step (g), is uncertain of word completion, and therefore points to the stop button, and observes the sender for a selection motion to test for word completion.

* * * * *